(12) United States Patent
Kasahara

(10) Patent No.: US 8,106,973 B2
(45) Date of Patent: Jan. 31, 2012

(54) IMAGE PROCESSING METHOD, IMAGE PROCESSING DEVICE, AND IMAGE CAPTURING DEVICE

(75) Inventor: Ryosuke Kasahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 392 days.

(21) Appl. No.: 12/382,147

(22) Filed: Mar. 10, 2009

(65) Prior Publication Data

US 2009/0231472 A1 Sep. 17, 2009

(30) Foreign Application Priority Data

Mar. 10, 2008 (JP) ................................. 2008-059704

(51) Int. Cl.
*H04N 5/217* (2006.01)
*H04N 9/64* (2006.01)

(52) U.S. Cl. ........................................ 348/241; 348/243

(58) Field of Classification Search .................. 348/207, 348/222, 239–241, 358, 399, 561–565, 228.1; 382/298–300; 355/32–52

See application file for complete search history.

(56) References Cited

U.S. PATENT DOCUMENTS

| | | | |
|---|---|---|---|
| 6,323,934 B1 | 11/2001 | Enomoto | 355/40 |
| 7,321,685 B2 * | 1/2008 | Okada et al. | 382/167 |
| 7,656,437 B2 * | 2/2010 | Yamada et al. | 348/228.1 |
| 2004/0227978 A1 | 11/2004 | Enomoto | |
| 2006/0017807 A1 | 1/2006 | Lee et al. | |

FOREIGN PATENT DOCUMENTS

| | | |
|---|---|---|
| EP | 1 473 671 | 11/2004 |
| JP | 3549413 | 4/2004 |
| JP | 2006-345053 | 12/2006 |
| JP | 2006-345054 | 12/2006 |
| JP | 2006-345055 | 12/2006 |
| JP | 2006-345056 | 12/2006 |

OTHER PUBLICATIONS

European Search Report dated Jul. 17, 2009.

* cited by examiner

*Primary Examiner* — Mohammed Hasan
(74) *Attorney, Agent, or Firm* — Harness, Dickey & Pierce, P.L.C.

(57) ABSTRACT

There is provided an image processing method configured to process an image captured by using an optical system with a wide view angle and a large magnification chromatic aberration, wherein a magnification chromatic aberration correction is conducted by conducting no coordinate transformation for an image of a particular color component while conducting a coordinate transformation for only an image of a color component except the particular color component. There is also provided an image processing device configured to process an image captured by using an optical system with a wide view angle and a magnification chromatic aberration, including a magnification chromatic aberration correction device configured to conduct a magnification chromatic aberration correction by conducting no coordinate transformation for an image of a particular color component while conducting a coordinate transformation for only an image of a color component except the particular color component.

11 Claims, 15 Drawing Sheets

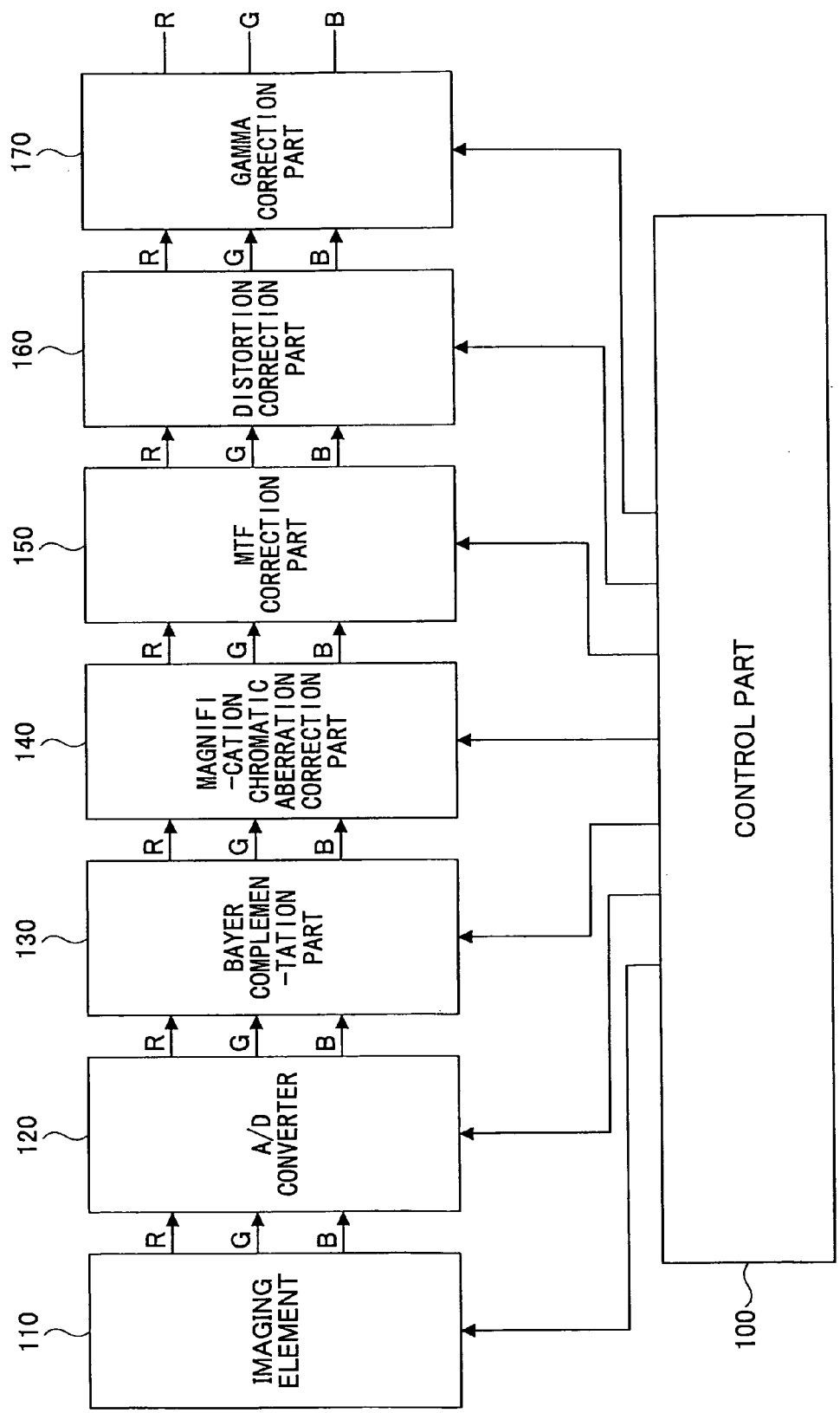

FIG.4

| 0 | −0.5 | 0 | −0.5 | 0 |
|---|---|---|---|---|
| −0.5 | 0 | −1.0 | 0 | −0.5 |
| 0 | −1.0 | 9.0 | −1.0 | 0 |
| −0.5 | 0 | −1.0 | 0 | −0.5 |
| 0 | −0.5 | 0 | −0.5 | 0 |

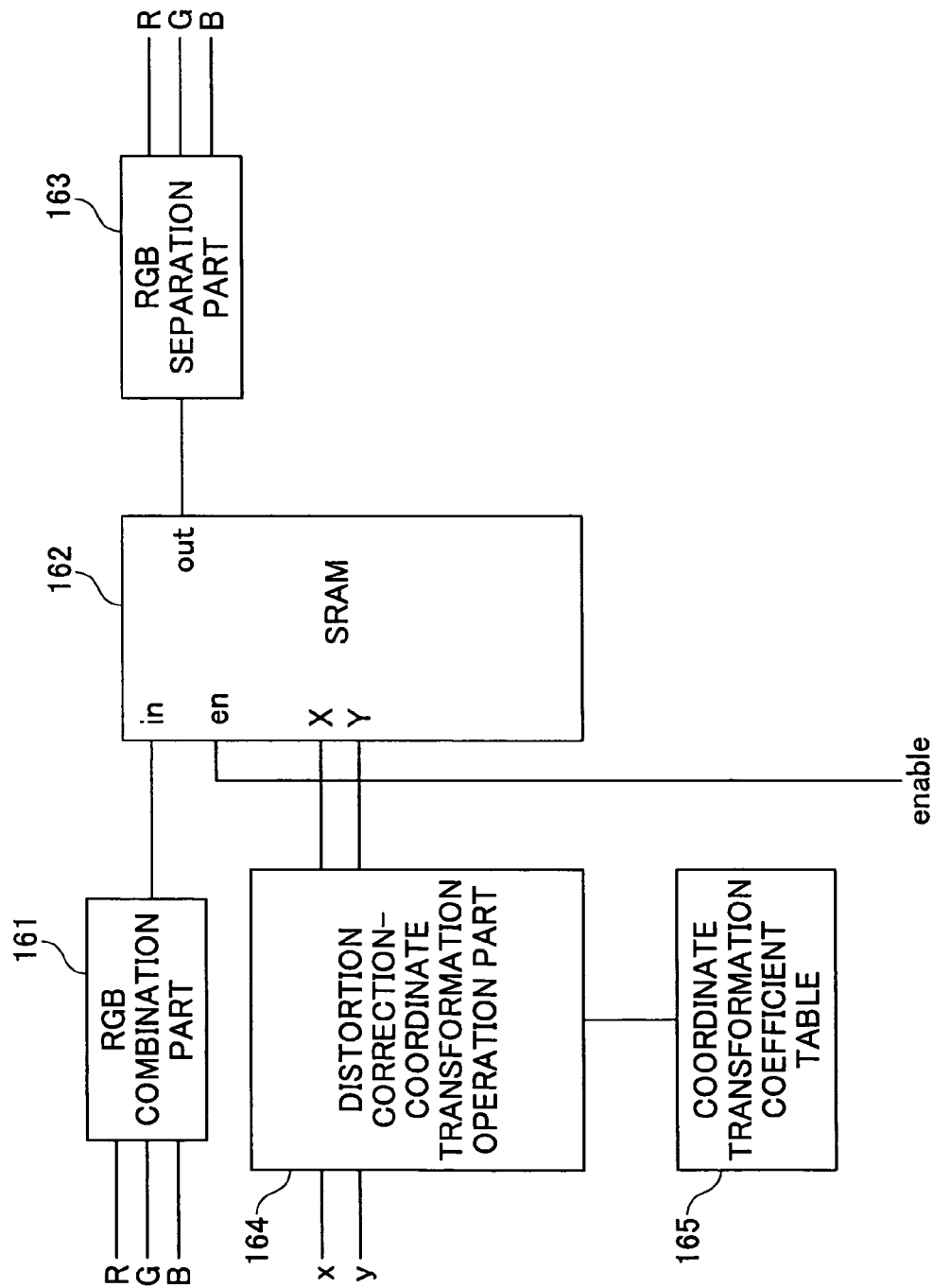

IMAGE PROCESSING METHOD, IMAGE PROCESSING DEVICE, AND IMAGE CAPTURING DEVICE

BACKGROUND OF THE INVENTION

1. Field of the Invention

The present invention relates to an image processing method, an image processing device, and an image capturing device.

2. Description of the Related Art

Recently, the demand of a wide angle image capturing device has increased for the application to a back-monitor of a car and the like. However, because the magnification chromatic aberration or distortion increases with increasing the view angle and it is difficult to design an optical system with a small aberration, it may be necessary to combine it with image processing so as to improve the performance.

As a conventional aberration correction technique in an image capturing device using an optical system with a certain magnification chromatic aberration or distortion, there is provided a method for applying a coordinate transformation to R (red), G (green) and B (blue) signals obtained by an image capturing device such as a CCD or a CMOS sensor, independently for each RGB color component at a subsequent stage, so that the magnification chromatic aberration and the distortion are corrected simultaneously, or a method for applying a coordinate transformation to all the RGB color components while the ignoring magnification chromatic aberration, so that only the distortion is corrected (for example, see JP-A-2006-345054.).

In the conventional method for applying a coordinate transformation to each RGB color component independently to correct the magnification chromatic aberration and the distortion simultaneously, a memory with a large capacity and a small latency at the time of random access, such as an SRAM, or a multi-port memory is needed for each RGB color component. However, a large capacity SRAM or a memory having plural ports is very expensive, and accordingly, the price of the device has been very high, particularly, in the case of a high resolution which requires a large capacity.

Meanwhile, the method for applying a common coordinate transformation to each RGB color component to correct only the distortion requires a large capacity memory and it may be possible to use a DRAM or the like in which the price of one chip or component is low but is not available if the magnification chromatic aberration is hardly ignored at a wide view angle.

Whereas the distortion is homogeneous over all of the RGB color components, the magnification chromatic aberration is different among the color components. Furthermore, the magnification chromatic aberration is smaller than the distortion. Therefore, it is preferable to correct the magnification chromatic aberration and the distortion separately.

Meanwhile, an independent correction circuit for each color component is commonly needed for correction of a magnification chromatic aberration and it may be necessary to correct the magnification chromatic aberration at the minimum circuit scale for cost reduction.

SUMMARY OF THE INVENTION

According to one aspect of the present invention, there is provided an image processing method configured to process an image captured by using an optical system with a wide view angle and a large magnification chromatic aberration, wherein a magnification chromatic aberration correction is conducted by conducting no coordinate transformation for an image of a particular color component while conducting a coordinate transformation for only an image of a color component except the particular color component.

According to another aspect of the present invention, there is provided an image processing device configured to process an image captured by using an optical system with a wide view angle and a magnification chromatic aberration, including a magnification chromatic aberration correction device configured to conduct a magnification chromatic aberration correction by conducting no coordinate transformation for an image of a particular color component while conducting a coordinate transformation for only an image of a color component except the particular color component.

According to another aspect of the present invention, there is provided an image capturing device, including an optical system with a wide view angle, and at least, a large magnification chromatic aberration, an image capturing element configured to read an image captured via the optical system, and the image processing device as described above.

BRIEF DESCRIPTION OF THE DRAWINGS

FIG. 1 is a block diagram illustrating the global function of an image capturing device according to one example of the present invention.

FIG. 4 is a diagram illustrating one example of an FIR filter.

FIG. 15 is a diagram illustrating one example of the configuration of a distortion correction part.

DETAILED DESCRIPTION OF THE PREFERRED EMBODIMENTS

Figure 2C:
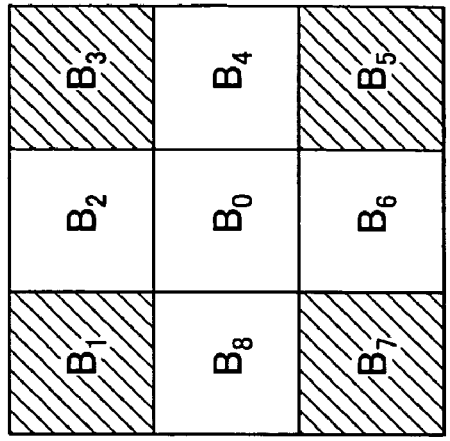
FIGS. 2A, 2B, and 2C are diagrams illustrating Bayer pattern color filters for a G signal, an R signal, and a B signal, respectively.

Next, at least one embodiment of the present invention will be described below.

An embodiment of the present invention relates to an image processing method, image processing device, and image capturing device for processing an image captured by using an optical system with a wide view angle and a large magnification chromatic aberration, and in particular, relates to a technique for correcting a magnification chromatic aberration of a captured image.

The inventor conceived of the idea of providing an image processing method and image processing device capable of correcting a magnification chromatic aberration at a minimum circuit scale without degrading a correction performance.

The inventor also conceived of the idea of installing an image processing device for conducting a magnification chromatic aberration correction on a small circuit scale to provide a low-cost image capturing device.

In one embodiment of the present invention, an image is captured by using an optical system with a wide view angle and a large magnification chromatic aberration, and a magnification chromatic aberration correction is conducted by conducting no coordinate transformation for an image of a particular color component and conducting a coordinate transformation for only an image of a color component except the particular color component. Herein, for example, the particular color component may be green (G) and color components except that may be red (R) and blue (B). Thereby, no correction circuit may be required for the particular color component and a circuit scale may be reduced.

Furthermore, a correction quantity may be obtained based on a coordinate of an image of the particular color component and a coordinate transformation may be conducted for an image of a color component except the particular color component based on the correction quantity. Thereby, it may be possible to further reduce a circuit scale. Moreover, an image of a color component except the particular color component may be adjusted by further multiplying a predetermined gain by a coordinate value. Thereby, it may be possible to adjust an asymmetric shift of a magnification chromatic aberration.

Furthermore, in one embodiment of the present invention, a magnification chromatic aberration correction and a distortion correction may be conducted simultaneously by further obtaining a correction quantity of a distortion commonly for each color component and each adding the correction quantity of a distortion to a coordinate value to an image of each color component, and a distortion correction may be separately conducted commonly for an image of each color component after conducting a magnification chromatic aberration correction. Thereby, it may be possible to treat an image captured by using an optical system with a large magnification chromatic aberration and distortion.

Due to an image processing method and image processing device according to an embodiment of the present invention, it may be possible to conduct a magnification chromatic aberration correction at a minimum circuit scale. Therefore, due to an image capturing device according to an embodiment of the present invention, it may be possible to conduct further cost reduction.

Next, one embodiment of the present invention will be described with reference to the drawings. The embodiment is an image capturing device for capturing an image of an object using an optical system with a wide view angle and a large magnification chromatic aberration and distortion, wherein an image processing system has a configuration for correcting not only a magnification chromatic aberration but also a distortion, and however, one feature of the embodiment is a magnification chromatic aberration correction and wherein it is only necessary for the image to be an image captured by using an optical system with, at least, a wide view angle and a large magnification chromatic aberration. Furthermore, the color components of an image are red (R), green (G) and blue (B) in accordance with three additive primary colors, and however, may be yellow (Y), magenta (M), and cyan (C) in accordance with three subtractive primary colors.

FIG. 1 is a block diagram illustrating the function of an image processing system in an image capturing device on which one embodiment of the present invention is applied. The image capturing device also includes a manipulation part, an image storage part, an image display part, and the like, which are omitted in FIG. 1. The image capturing device is used as, for example, an on-vehicle camera, and of course, the application is not limited thereto.

In FIG. 1, a control part 100 provides a control a signal (clock, horizontal/vertical synchronizing signals, or the like) necessary for each part of the device so as to control the operation of the each part in a manner of a pipeline.

An image capturing element 110 is composed of, for example, a CCD, CMOS sensor, or the like, for converting an optical image captured by using an optical system with a wide view angle and a large magnification chromatic aberration and distortion (not illustrated in the figure) into an electric signal (image data). The image capturing element 110 is provided with a Bayer pattern color filter and Bayer pattern RGB image data are sequentially output based on coordinate values (x, y) provided from the control part 100. Furthermore, the control part 100 also sequentially provides the coordinate values (x, y) to a subsequent stage with a predetermined time deviation which are provided to the image capturing element 110. Additionally, the coordinate values (x, y) may be generated inside the image capturing element 110 while clock and horizontal/vertical synchronizing signals are inputs, and may be sequentially provided to the subsequent stage from the image capturing element 110.

An A/D converter 120 converts Bayer pattern RGB image data as an analog signal output from the image capturing element 110 into a digital signal to send it to a Bayer complementation part 130. The digital signal is composed of, for example, 8 bits for each of RGB. At a front stage of the A/D converter 120, an AGC circuit is generally provided but omitted herein.

The Bayer complementation part 130 receives an input of Bayer pattern RGB image data which have been converted into a digital signal, then generates image data at all the coordinate positions (pixel data) independently for each of RGB colors by means of a linear complementation, and sends them to a magnification chromatic aberration complementation part 140.

Figure 2B:
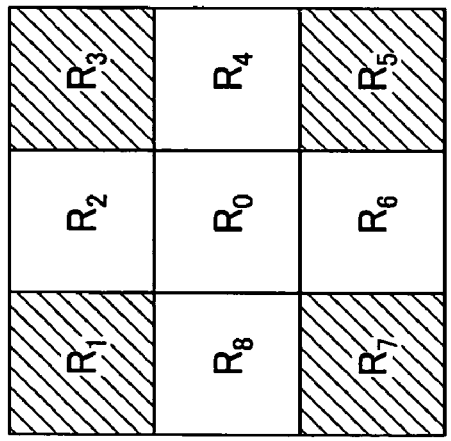
Figure 2A:
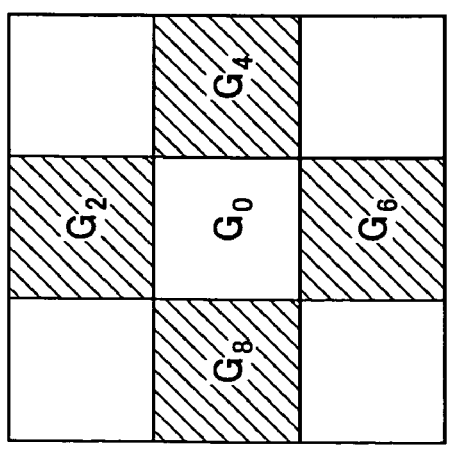

FIGS. 2A, 2B, and 2C illustrate Bayer pattern color filters. Herein, $G_0$ is obtained by the following formula:

$$G_0 = (G_2 + G_4 + G_6 + G_8)/4 \quad (1).$$

Furthermore, $R_2$, $R_4$, $R_6$, $R_8$, and $R_0$ are obtained by the following formulas:

$$R_2 = (R_1 + R_3)/2 \quad (2),$$

$$R_4 = (R_3 + R_5)/2 \quad (3),$$

$$R_6 = (R_5 + R_7)/2 \quad (4),$$

$$R_8 = (R_1 + R_7)/2 \quad (5), \text{ and}$$

$$R_0 = (R_1 + R_3 + R_5 + R_7)/4 \quad (6).$$

$B_2$, $B_4$, $B_6$, $B_8$, and $B_0$ are the same as the case of the above-mentioned $R_2$, $R_4$, $R_6$, $R_8$, and $R_0$ and therefore omitted.

Additionally, although the image capturing element having Bayer pattern color filters has been described in the present example, an image capturing element having another color filter pattern such as an CMYG pattern or an RGB+Ir (infrared) pattern is, of course, also effective. Thus, a memory with an even lower latency or a 4-port RAM may be needed for a magnification chromatic aberration correction in an image capturing element having four color filter patterns, as compared with a three-color type such as an RGB type.

The magnification chromatic aberration correction part 140 receives an input of Bayer-complemented R, G, and B image data, then independently applies a coordinate transformation (magnification chromatic aberration coordinate transformation) to each of RGB color components by means of a predetermined polynomial or the like, and outputs RGB image data with the corrected magnification chromatic aberration. The magnification chromatic aberration correction part 140 will be described in detail below, and it is possible to use a memory with a low capacity and a low latency or a memory having a low capacity and plural ports (such as an SRAM) for the coordinate transformation for a magnification chromatic aberration correction. Furthermore, it is possible to reduce a circuit scale of a coordinate transformation operation part by application of the example.

The MTF correction part 150 receives an input of the RGB image data with the corrected magnification chromatic aberration and applies an MTF correction by using an FIR filter so as to output RGB image data with corrected MTF (enhanced high frequencies).

Figure 3:
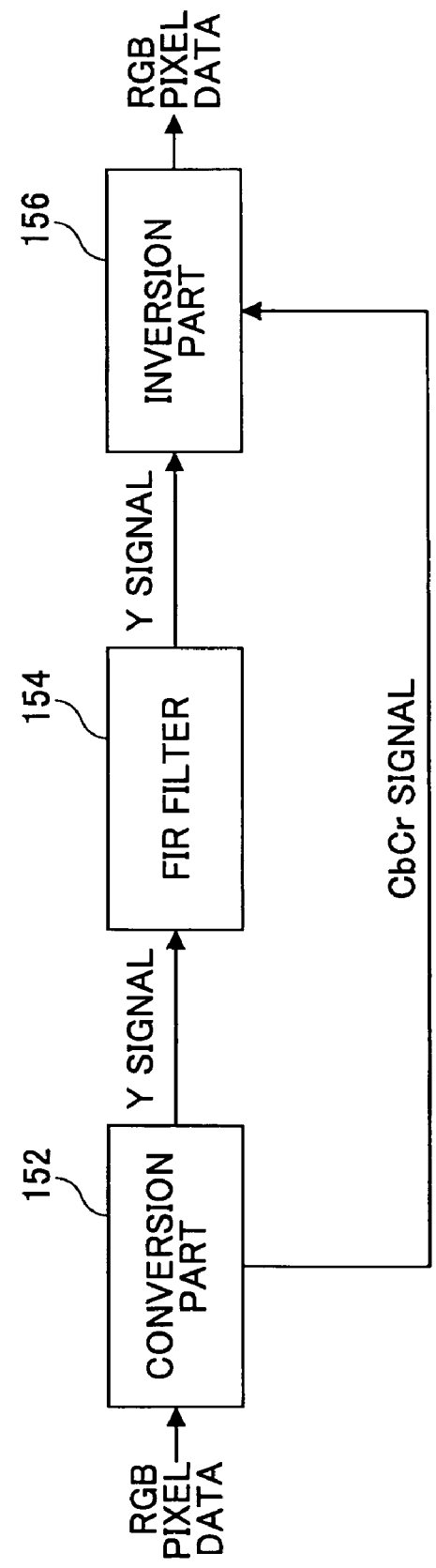
FIG. 3 is a schematic diagram illustrating the configuration of an MTF correction part.

FIG. 3 is a schematic diagram illustrating the configuration of the MTF correction part 150. A conversion part 152 converts RGB image data into YCbCr image data in accordance with the following formulas:

$$Y = 0.299R + 0.587G + 0.114B \quad (7),$$

$$Cr = 0.500R - 0.419G - 0.081B \quad (8),$$

and $$Cb = -0.169R - 0.332G + 0.500B \quad (9).$$

An FIR filter (5×5 filter) 154 receives an input of only a brightness signal Y among the YCbCr and conducts a predetermined MTF correction. Filtering (MTF correction) of only Y signal is conducted whereby it is possible to obtain a high quality image with suppressed increase of color noise. FIG. 4 illustrates one example of FIR filter coefficients.

An inversion part 156 receives an input of the CbCr signal and the Y signal with a corrected MTF, then conducts inversion in accordance with the following formulas:

$$R = Y + 1.402Cr \quad (10),$$

$$G = Y - 0.714Cr - 0.344Cb \quad (11), \text{ and}$$

$$B = Y + 1.772Cb \quad (12),$$

and outputs RGB image data.

A distortion correction part 160 receives an input of the RGB data with corrected magnification chromatic aberration and corrected MTF, then applies a common coordinate transformation (distortion coordinate transformation) to each of the RGB color components by means of a predetermined polynomial or the like, and outputs RGB image data with a corrected distortion. For the coordinate transformation at the distortion correction part 160, it is possible to use a memory with a high latency (such as a DRAM) because only 1 port is needed although the memory capacity (at most, for 1 image) is larger than the memory for magnification chromatic aberration correction. The distortion correction part 160 will be described in detail below.

A gamma correction part 170 receives an input of the RGB image data output from the distortion correction part 160, then applies a predetermined gamma correction operation by using a look-up table for each of RGB or the like, and outputs gamma-corrected RGB image data. The output image data of the gamma correction part 170 are sent to a display part (not illustrated in the figure) and displayed on a monitor.

Although the global operation of the embodiment as illustrated in FIG. 1 is described above, the magnification chromatic aberration correction part 140 and the distortion correction part 160 will be described in detail below. First, the principles of a magnification chromatic aberration correction and distortion correction will be described.

Figure 5:
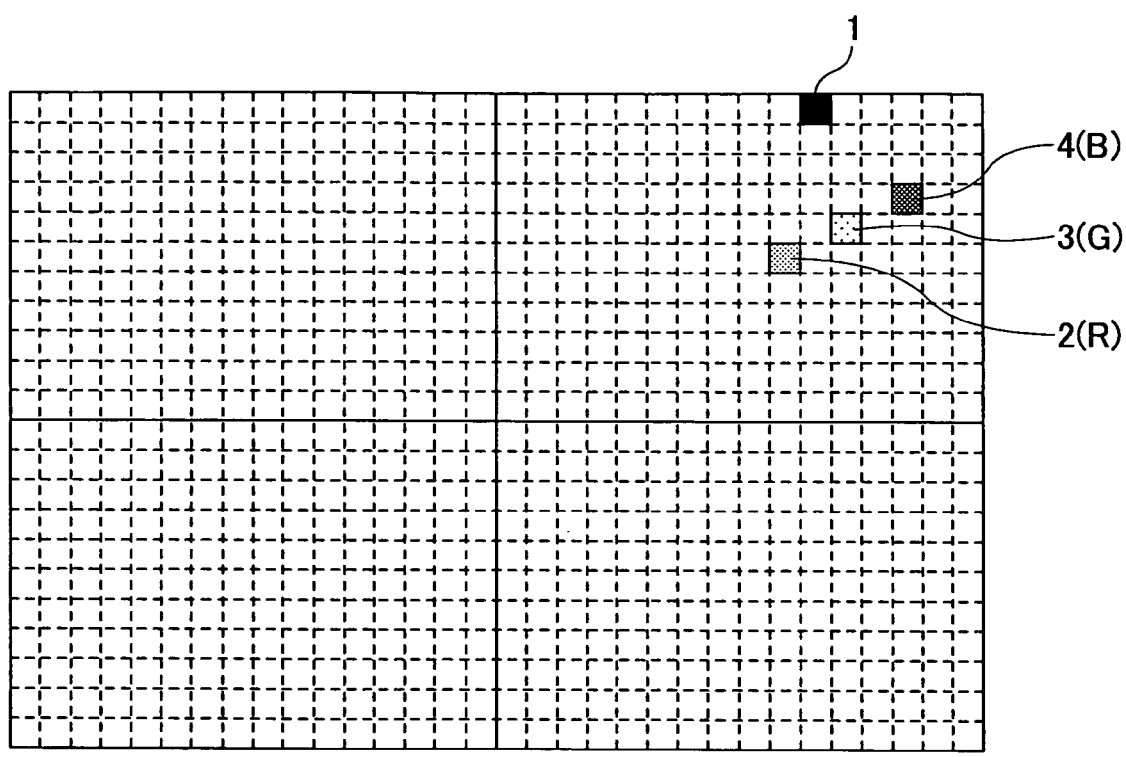
FIG. 5 is a diagram illustrating a magnification chromatic aberration and a distortion.

As schematically illustrated in FIG. 5, when imaging is conducted by using an optical system with a magnification chromatic aberration and distortion, image data (pixel data) at the position (pixel) denoted by "1" in the upper right part of a screen are shifted from an original position due to a distortion and further each of RGB color components is shifted differently due to a magnification chromatic aberration so that the positions of RGB imaged by an image capturing element practically are positions "2" (R), "3" (G), and "4" (B), respectively. It is possible to correct the magnification chromatic aberration and the distortion by copying, that is, conducting a coordinate transformation of, the image data of each of the RGB color components at the positions (pixels) of "2" (R), "3" (G), and "4" (B) onto the position (pixel) "1" which is the original position. Herein, the positions "2", "3" and "4" are referred to as coordinates after coordinate transformation and the position "1" is referred to as a coordinate before coordinate transformation.

Because the magnitude of the distortion and the magnitude of the magnification chromatic aberration are known from design data of an optical system, it is possible to calculate which position each of the RGB color components is shifted from the original position to.

Figure 6:
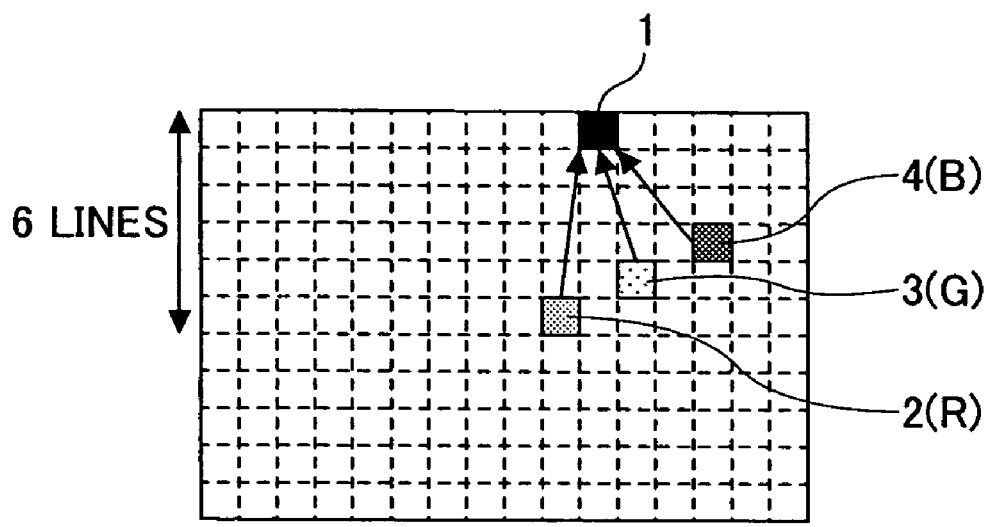
FIG. 6 is a diagram illustrating that a magnification chromatic aberration and a distortion are corrected simultaneously.

FIG. 6 schematically illustrates a method for correcting a magnification chromatic aberration and distortion simultaneously. That is, it is possible to correct the magnification chromatic aberration and the distortion simultaneously by copying, that is, conducting a coordinate transformation of, image data of each of the RGB color components at the positions (pixels) "2" (R), "3" (G), and "4" (B) onto the position (pixel) "1" which is the original position. However, this method may require a memory with a large capacity for each of RGB color components and a low latency or a multi-port memory. For example, in the case of FIG. 6, a high-speed 6-line memory may be needed for each of RGB for coordinate transformation. Furthermore, a coordinate transformation operation circuit or a coordinate transformation cable (LUT) may be needed for each of RGB.

Figure 7A:
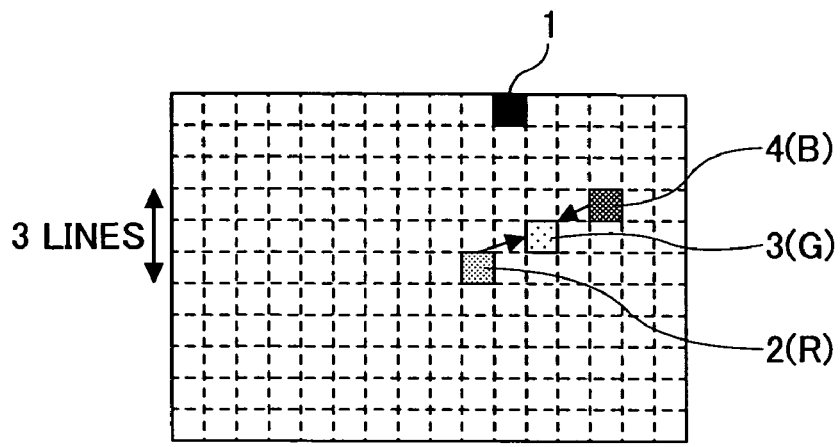
FIGS. 7A and 7B are diagrams illustrating that a magnification chromatic aberration and a distortion are separately corrected, respectively.
Figure 7B:
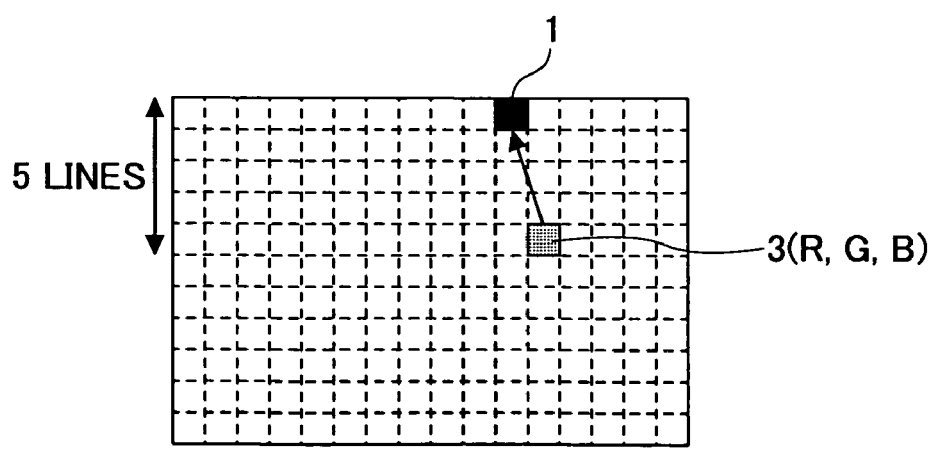

FIGS. 7A and 7B schematically illustrate a method for correcting a magnification chromatic aberration (FIG. 7A) and distortion (FIG. 7B) separately. The magnification chromatic aberrations of color components are different from one another but the shift caused thereby is small. On the other hand, a shift caused by the distortion is large but is equal for each color component. As attention is paid to this matter, coordinate transformation is first applied to image data of each of RGB color components to correct magnification chromatic aberrations and subsequently coordinate transformation is applied to all the RGB data with corrected magnification chromatic aberration to correct distortion. Thereby, it is possible to separate a memory for coordinate transformation into a memory with a small capacity and high-speed (a low latency or multiple ports) for RGB necessary for magnification chromatic aberration correction and a memory with a large capacity and low-speed (a high latency or a single port) common to RGB necessary for distortion correction, whereby it is possible to reduce the cost totally.

Furthermore, in general, the color components of R and B are shifted nearly symmetrically centered on G due to a magnification chromatic aberration. Therefore, the magnification chromatic aberration is attained by only conducting coordinate transformation of color components R and B and copying them onto the position of a G component. Thereby, a coordinate transformation operation circuit or coordinate transformation table (LUT) for magnification chromatic aberration correction is needed for only the RB color components and it is possible to reduce a circuit scale whereby it is possible to further reduce the cost totally.

FIG. 7A schematically illustrates a magnification chromatic aberration correction, wherein coordinate transformation is applied to image data (pixel data) of RB color components at the positions (pixels) "2" (R) and "4" (B) and they are copied onto the position (pixel) "3" (G) of the G component. The magnification chromatic aberrations are corrected by this operation. FIG. 7B schematically illustrates a distortion correction, wherein a coordinate transformation is applied to all of the image data of the RGB color components at the position (pixel) "3" in which the magnification chromatic aberrations have been corrected and they are copied onto the position (pixel) "1" which is the original position. The distortion is corrected by this operation.

In the example in FIGS. 7A and 7B, a 3-line memory for each of RGB is sufficient for a high-speed memory for a magnification chromatic aberration correction. In addition, although a 5-line memory is needed for a distortion correction, a low-speed memory common to RGB is allowed and it is possible to attain cost reduction totally as compared with the case of FIG. 6. Furthermore, a coordinate transformation operation circuit or coordinate transformation table for a magnification chromatic aberration correction is needed for only RB color components, and it is possible to attain further cost reduction totally.

Additionally, a distortion intended herein means a lens distortion with respect to an intended projection manner, wherein the intended projection manner may be, for example, a projection manner of obtaining an image looked down from above a camera and includes a projection manner of enlarging and displaying a part.

Figure 8:
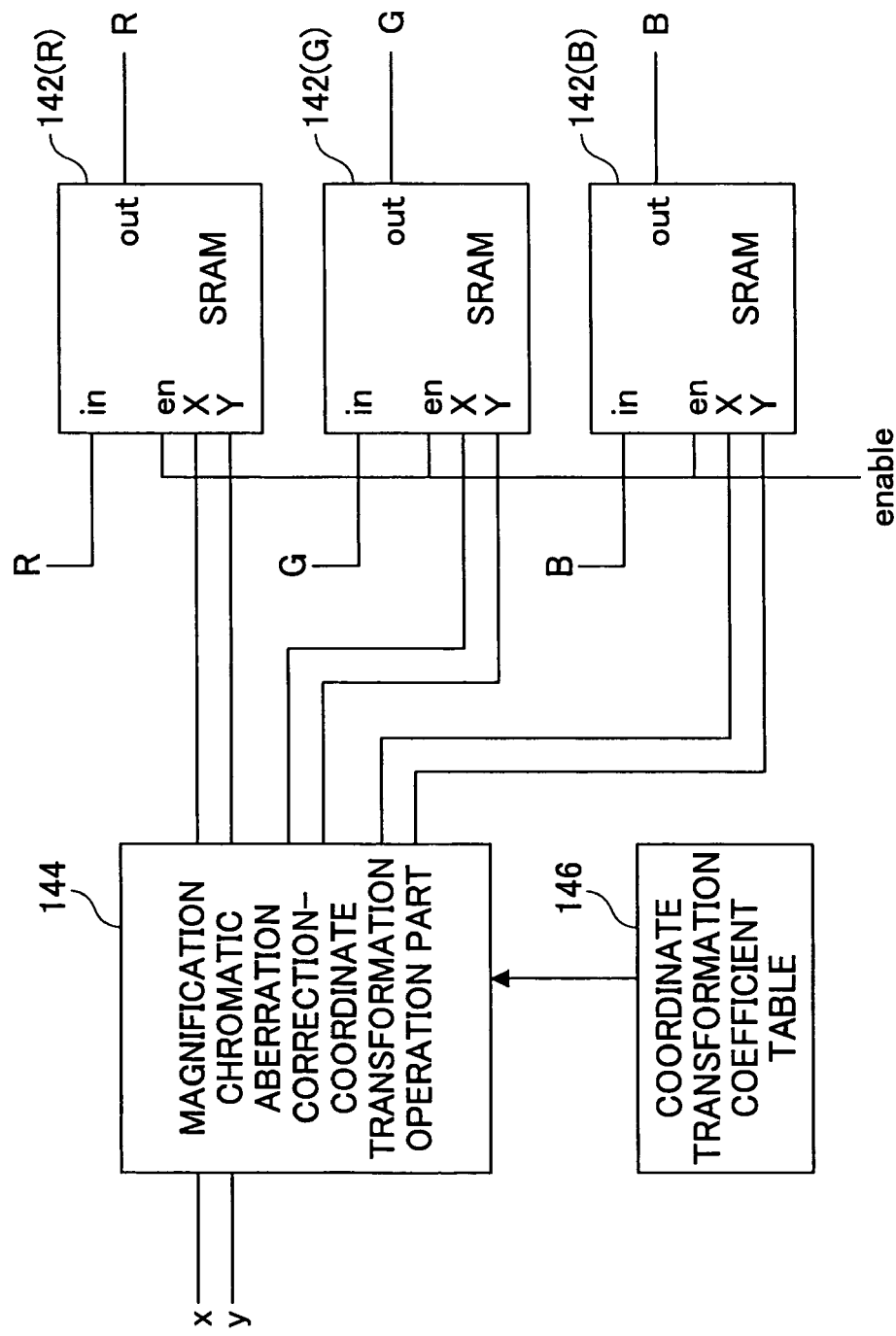
FIG. 8 is a diagram illustrating one example of the configuration of a magnification chromatic aberration correction part.

FIG. 8 is a diagram illustrating the configuration of one example of the magnification chromatic aberration correction part 140.

There are provided a coordinate transformation memories for magnification chromatic aberration correction (line buffers) 142, whose RGB color components correspond to 142(R), 142(G), and 142(B), respectively, a magnification chromatic aberration correction-coordinate transformation operation part 144 for calculating a coordinate transformation for magnification chromatic aberration correction with respect to each of RGB (only R and B in practice) in accordance with a predetermined coordinate transformation formula, and a coordinate transformation coefficient table for holding a coefficient used in the coordinate transformation formula.

For a magnification chromatic aberration correction operation, a memory with a small capacity and 3 ports for RGB or a memory with a low latency is needed as a line buffer. Herein, the maximum shift caused by a magnification chromatic aberration is supposed to be 20 lines to a Y direction and each of the coordinate transformation memories 142(R), 142(G), and 142 (B) is composed of an SRAM for 20 lines. The size in X directions is determined depending on the resolution, and for example, the size in X directions is 640 dots for the resolution VGA (640×480). When the color depth for each of RGB is 8 bits, reading from and writing in any of the coordinate transformation memories 142(R), 142(G) and 142(B) is conducted in an 8-bit unit.

Because the coordinate transformation memories for magnification chromatic aberration correction (line buffers) 142 (R), 142 (G), and 142 (B) have thus small capacities, it is desirable to provide a configuration such that 3-port SRAMs installed in an image processing chip of the image capturing device are used to ensure each memory area of 20 lines. Additionally, in the case of a memory with a low latency, such as an SRAM, it is possible to use a 1-port memory as if it were a 3-port memory by means of time sharing.

RGB image data of a captured image having a magnification chromatic aberration and a distortion are written in the coordinate transformation memories 142(R), 142(G), and 142(B), respectively, sequentially from the first line, in accordance with the coordinate values (x, y). Then, as each of image data of 20 lines is written, the image data are erased sequentially from the first line, and instead, image data of subsequent lines are newly written. Thus, RGB image data of 20 lines at most which are required for a magnification chromatic aberration correction coordinate transformation are sequentially stored in the coordinate transformation memories 142(R), 142(G), and 142(B), respectively.

Herein, coordinate values (x, y) indicate a position for reading out 1 frame of a captured image. Meanwhile, because the coordinate transformation memories 142(R), 142(G), and 142(B) are line buffers of 20 lines and writing lines are changed cyclically, it may be impossible to use the coordinate values (x, y) for writing addresses of the coordinate transformation memories 142(R), 142(G), and 142(B) without a change. Therefore, it may be necessary to convert the coordinate values (x, y) into real addresses of the coordinate transformation memories 142(R), 142(G), and 142(B), wherein such a configuration is omitted in FIG. 8. This also applies to the relation between coordinate values (X, Y) after transformation in a reading operation as described below and the read-out addresses of the coordinate transformation memory 142(R), 142(G), or 142(B).

The magnification chromatic aberration correction-coordinate transformation calculation part 144 receives inputs of coordinate values (x, y) which are coordinates before coordinate transformation, then calculates coordinates transformed for magnification chromatic aberration correction for each of RGB in accordance with a predetermined coordinate transformation formula such as a polynomial, and outputs coordinate values (X, Y) which are coordinates after coordinate transformation for each of RGB. As illustrated in FIG. 7A, a coordinate transformation for magnification chromatic aberration correction is only applied to the R and B color components so as to copy them at the position of the G component. Therefore, the magnification chromatic aberration correction-coordinate transformation operation part 144 outputs input coordinate values (x, y) for G component as coordinate values (X, Y) after transformation without a change and transforms input coordinate values (x, y) for each of R and B color components into coordinate values (X, Y) using a predetermined coordinate transformation formula so as to output the coordinate values (X, Y) after transformation. These are repeated for each set of coordinate values (x, y).

Herein, when the center of a screen is an origin, it is possible to represent the coordinate transformation formula as, for example, a set of:

$$X=x+[a(1)+a(2)\times abs(x)+a(3)\times abs(y)+a(4)\times y^2]\times x, \text{ and}$$

$$Y=y+[b(1)+b(2)\times abs(y)+b(3)\times abs(x)+b(4)\times x^2]\times y, \quad (13),$$

wherein abs ( ) indicates an absolute value and a(1)-a(4) and b(1)-b(4) are coordinate transformation coefficients. The coordinate transformation coefficients have already been held in the coordinate transformation coefficient table 146.

The coordinate transformation memories 142(R), 142(G), and 142(B) sequentially read out RGB image data, respectively, based on the coordinate values (X, Y) output from the magnification chromatic aberration correction-coordinate transformation operation part 144 (in practice, values provided by address conversion of the coordinate values (X, Y)) in parallel with (in practice, at a predetermined delayed time after) the above-mentioned writing operation. In this case, G component image data at the same position as that at the time of writing are read out from the coordinate transformation memory 142(G). On the other hand, RB color component image data at the positions with predetermined positional shifts from those at the time of writing, that is, the positions shifted by magnification chromatic aberrations are read out from the coordinate transformation memories 142(R) and 142(B).

In the above process, RGB image data with a corrected magnification chromatic aberrations are output from the coordinate transformation memories 142(R), 142(G), and 142(B). That is, RGB image data on the coordinate values (X, Y) after coordinate transformation are output based on RGB image data on the coordinate values (x, y) before coordinate transformation.

FIGS. 9 to 13 illustrate some examples of the configuration of the magnification chromatic aberration correction-coordinate transformation operation part 144. Additionally, although the basis is a G color component herein, the basis of R or B is also allowed.

Figure 9:
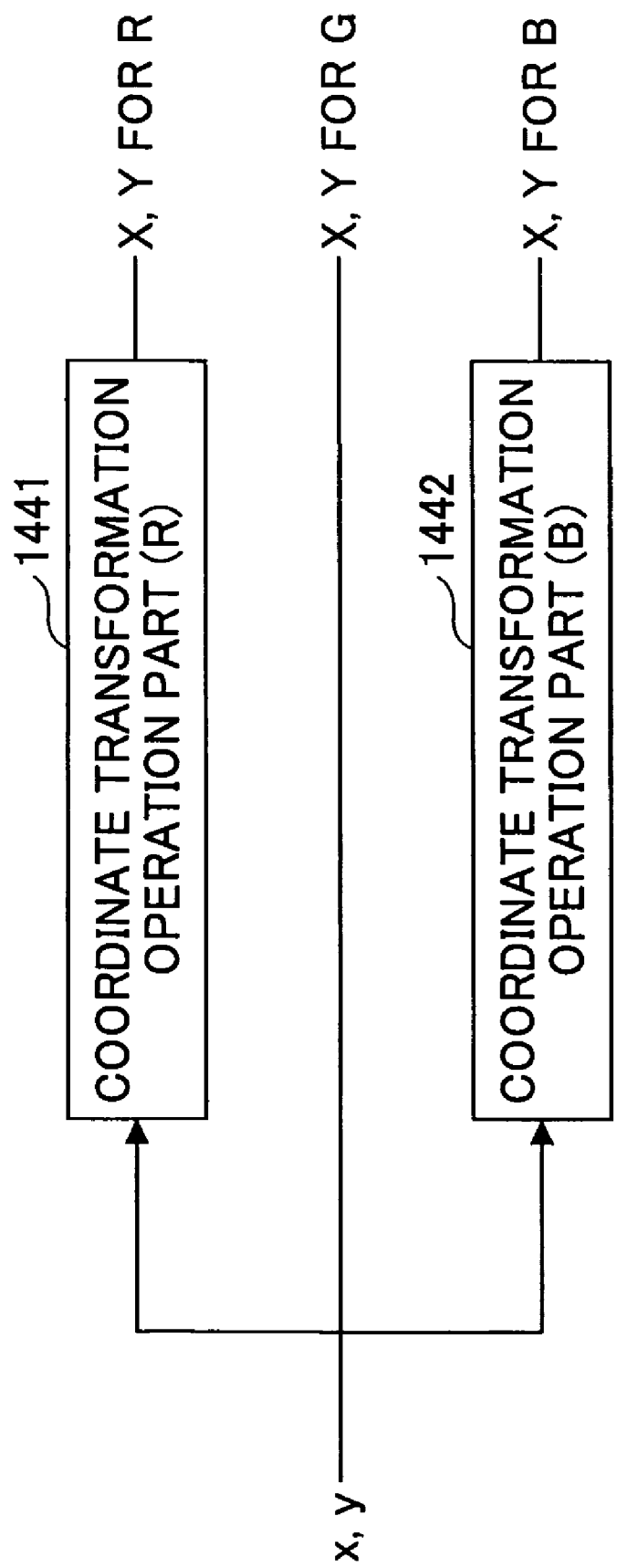
FIG. 9 is a diagram illustrating a first example of the configuration of a magnification chromatic aberration correction-coordinate transformation operation part.

FIG. 9 illustrates a specific example in which only for R and B color components, input coordinate values (x, y) are transformed by coordinate transformation operation parts 1441 and 1442, respectively, using a set of formulas (13) or the like so as to output coordinate values for R (X, Y) and coordinate values for B (X, Y) after coordinate transformation, while no coordinate transformation is applied to a G color component and input coordinate values (x, y) are output as coordinate values (X, Y) after coordinate transformation without a change. Because the coordinate transformation operation parts are needed for only the R and B color components, a small circuit scale is allowed.

Figure 10:
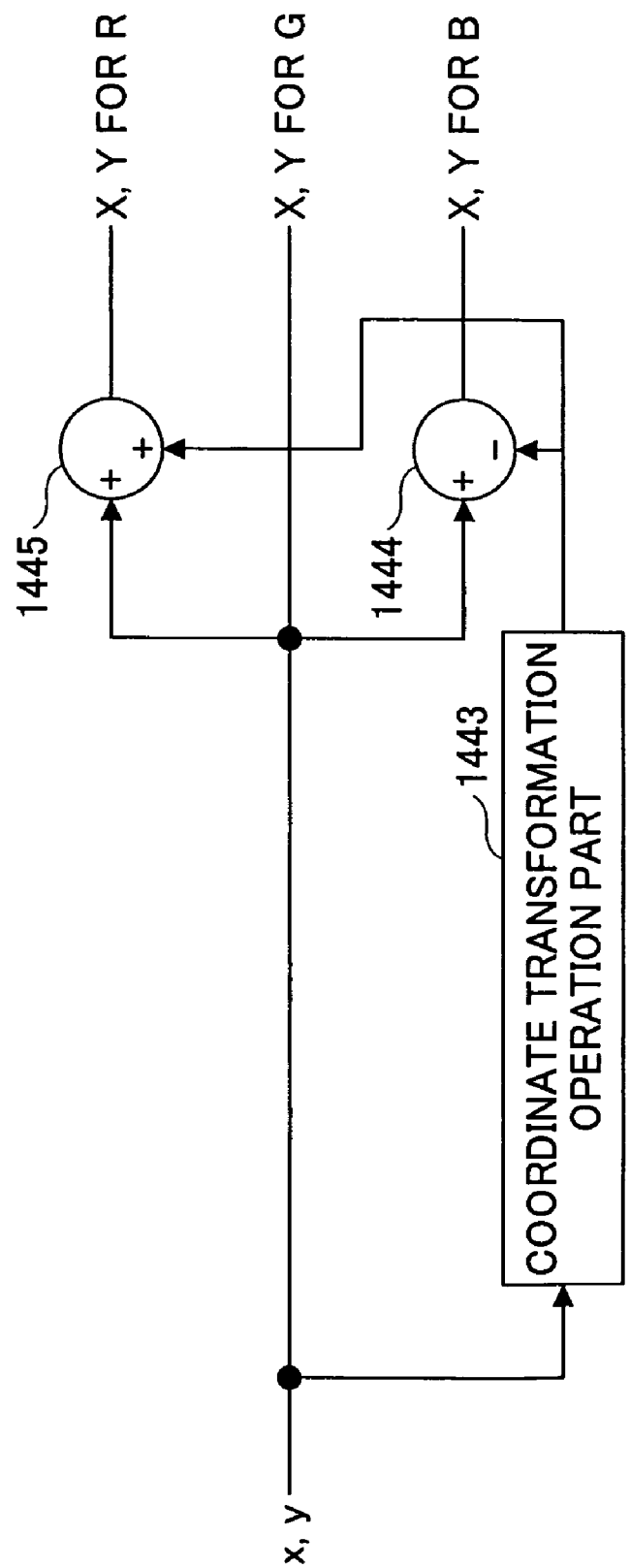
FIG. 10 is a diagram illustrating a second example of the configuration of a magnification chromatic aberration correction-coordinate transformation operation part.
Figure 11:
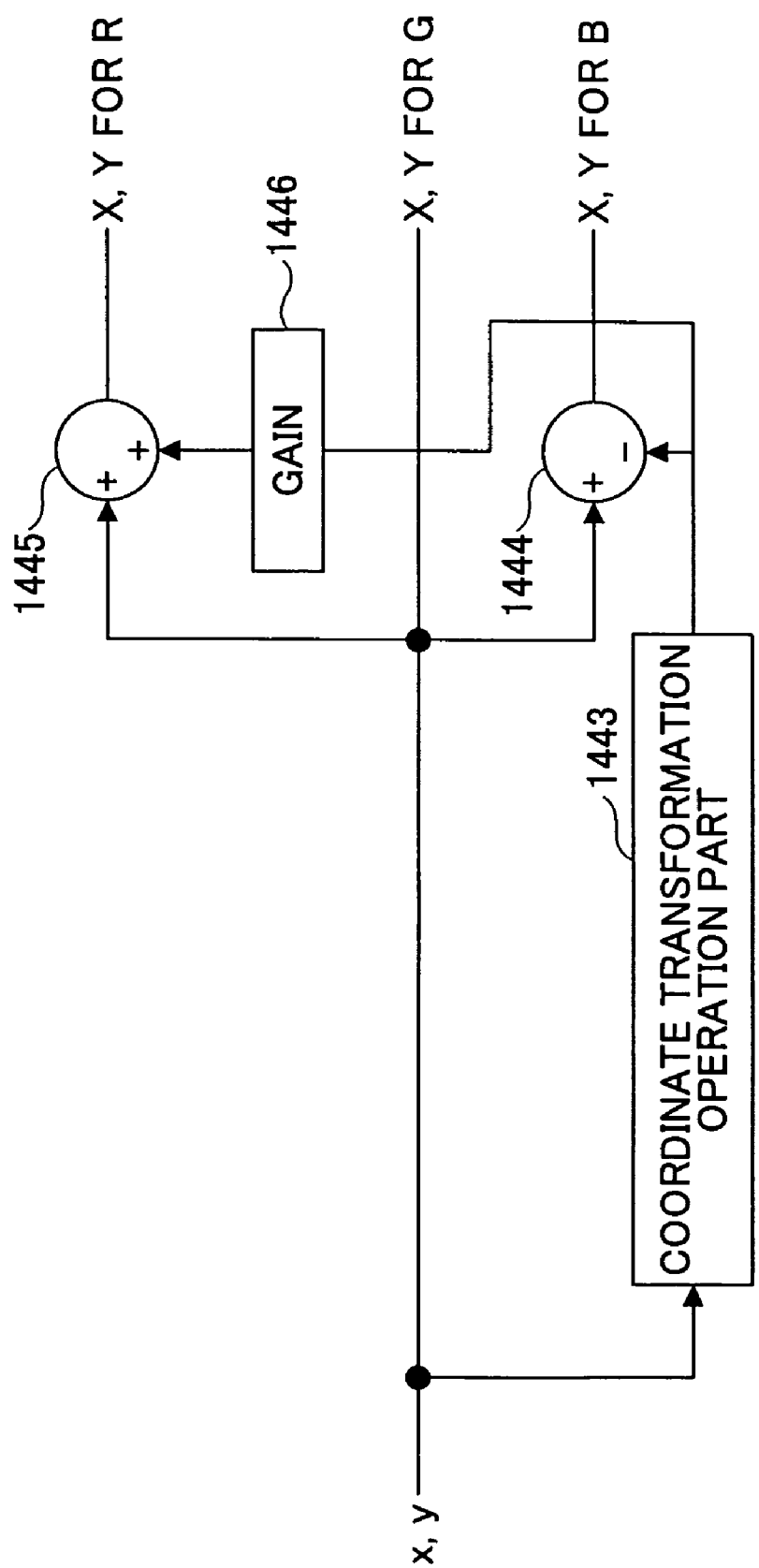
FIG. 11 is a diagram illustrating a third example of the configuration of a magnification chromatic aberration correction-coordinate transformation operation part.
Figure 12:
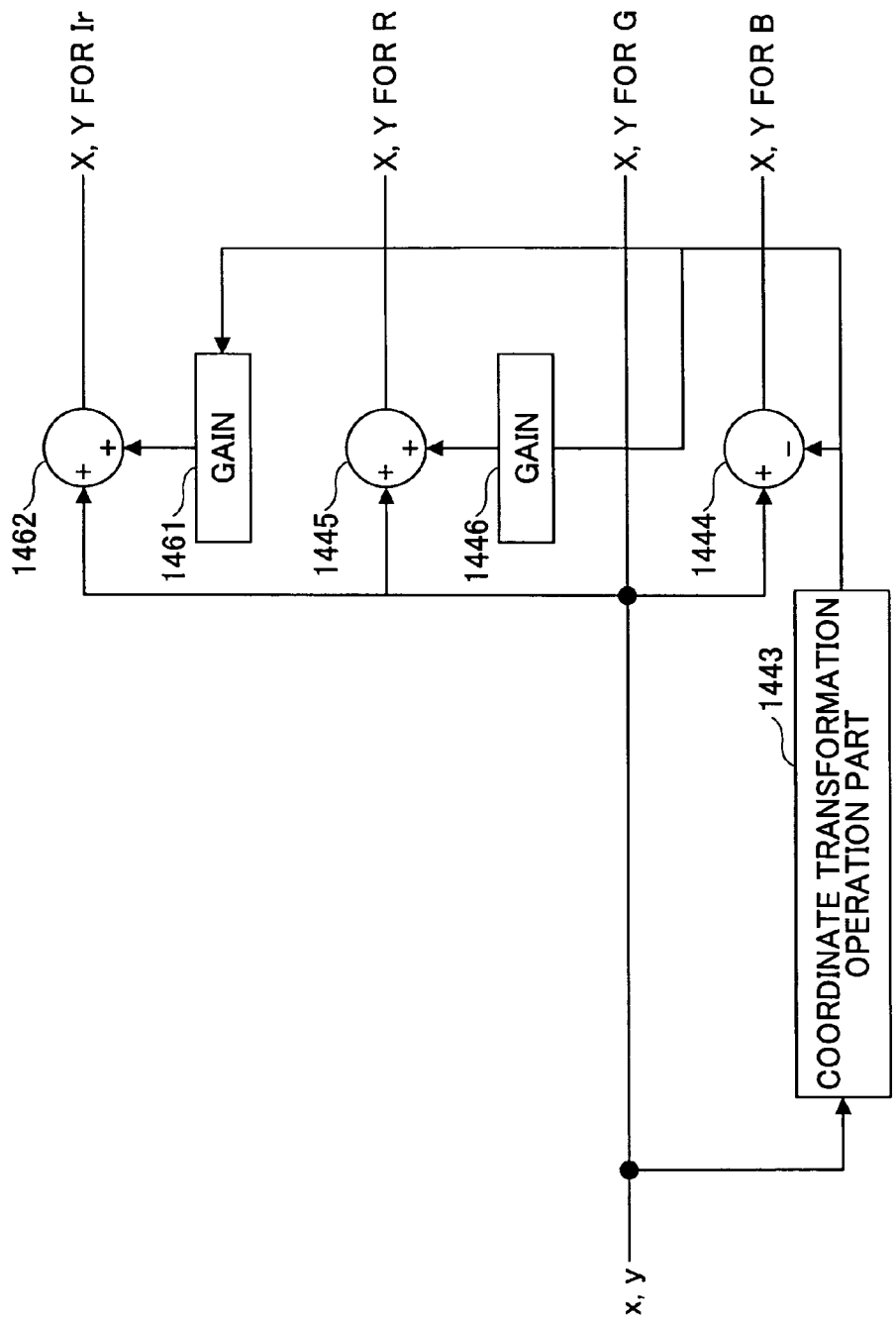
FIG. 12 is a diagram illustrating a fourth example of the configuration of a magnification chromatic aberration correction-coordinate transformation operation part.

In FIG. 10 and FIG. 11, attention is paid to a magnification chromatic aberration which is generally a nearly symmetric shift of an R or B color component cantered on G (see FIG. 7A). Herein, FIG. 10 illustrates a specific example in which correction quantities (shift quantities) for coordinate values (x, y) are obtained by a coordinate transformation operation part 1443 and the values provided by subtracting the correction quantities from the coordinate values (x, y) in a subtraction part 1444 are coordinate values for B (X, Y) while the values provided by adding the correction quantities to the coordinate values (x, y) in an addition part 1445 are coordinate values for R (X, Y). Similarly to FIG. 9, for coordinate values for G (X, Y), the coordinate values (x, y) are output without a change. FIG. 11 illustrates that the correction quantity for R is further adjusted by a gain circuit 1446 with respect to the difference between the symmetrical positional shifts. Additionally, the gain circuit may be provided for the B side. According to the specific example illustrated in FIG. 10 or FIG. 11, only one coordinate transformation operation part is needed whereby it is possible to further reduce the circuit scale.

The above configurations may be used similarly for a sensor which has an Ir pixel in addition to the R, G, and B pixels and is capable of capturing an infrared region and the like. In this case, as illustrated in, for example, FIG. 12, a gain circuit for Ir 1461 and an addition part 1462 are added to the configuration illustrated in FIG. 11 whereby it is possible to calculate coordinate values for B by one coordinate transformation operation part 1443 and coordinate values for R and Ir via gains, and therefore, only one coordinate transformation operation part is needed on the condition that three coordinate transformation operation parts were needed conventionally, whereby it is possible to further reduce a circuit scale.

Figure 13:
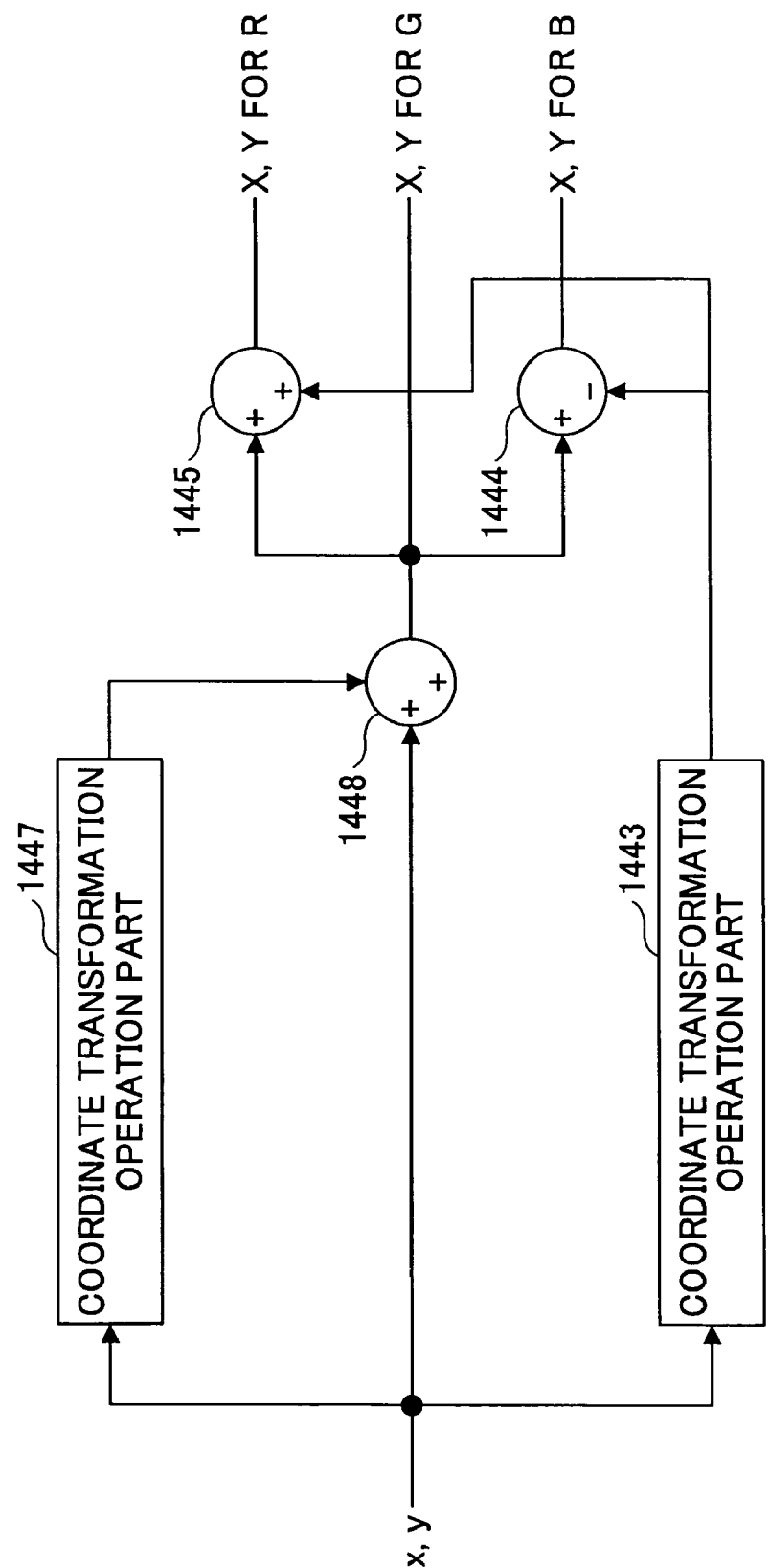
FIG. 13 is a diagram illustrating a fifth example of the configuration of a magnification chromatic aberration correction-coordinate transformation operation part.
Figure 14:
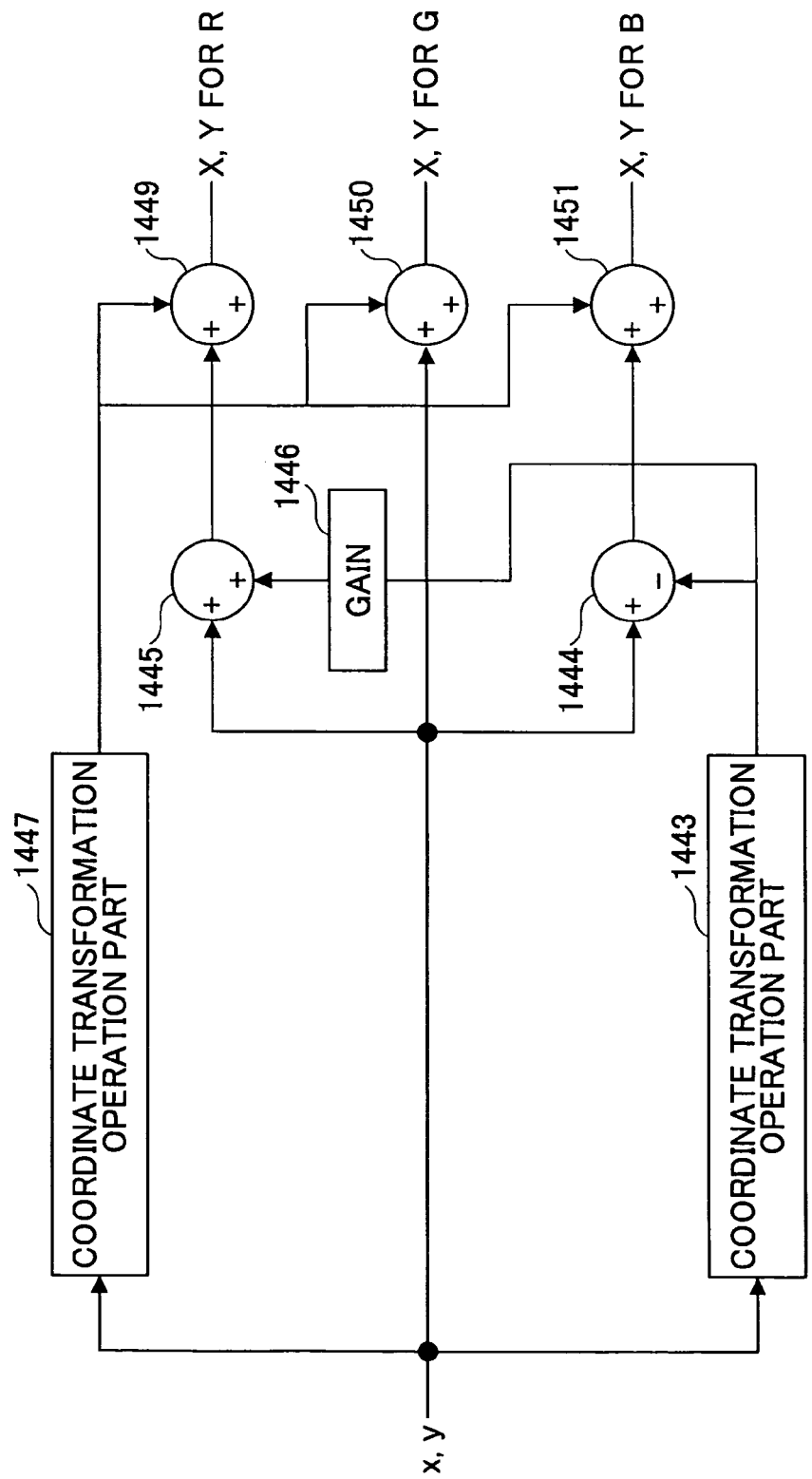
FIG. 14 is a diagram illustrating a sixth example of the configuration of a magnification chromatic aberration correction-coordinate transformation operation part.

FIG. 13 and FIG. 14 illustrate examples of a configuration for conducting a magnification chromatic aberration correction and a distortion correction simultaneously. In these cases, a distortion correction part 160 as described below is not needed.

FIG. 13 is a specific example in which a correction quantity (shift quantity) for a distortion common to RGB is obtained for coordinate values (x, y) by a coordinate transformation operation part 1447 using a predetermined polynomial or the like and the correction quantity is added to the coordinate values (x, y) in an addition part 1448 while outputs of the addition part 1448 are coordinate values for G (X, Y) and one of inputs of a subtraction part 1444 and addition part 1445. The operations of the coordinate transformation operation part 1443, subtraction part 1444, and addition part 1445 are similar to those illustrated in FIG. 10. According to the configuration illustrated in FIG. 13, the coordinate values for each of RGB (X, Y) indicate coordinates after a coordinate transformation with respect to both of correction quantities of a magnification chromatic aberration and distortion.

FIG. 14 is a specific example in which a correction quantity for a distortion common to RGB is similarly obtained by a coordinate transformation operation part 1447 using a predetermined polynomial or the like, and the values provided by adding an output of an addition part 1445 to an output of the coordinate transformation operation part 1447 in an addition part 1449 are coordinate values for R (X, Y), while the values provided by adding input coordinate values (x, y) to an output of the coordinate transformation operation part 1447 in an addition part 1450 are coordinate values for G (X, Y) and the values provided by adding an output of a subtraction part 1444 to an output of the coordinate transformation operation part 1447 in an addition part 1451 are coordinate values for B (X, Y). According to the configuration illustrated in FIG. 14, the coordinate values for each of RGB (X, Y) indicate coordinates after a coordinate transformation with respect to both of correction quantities of a magnification chromatic aberration and distortion, similarly to the case of FIG. 13.

Herein, a look-up-table (LUT) in which the correspondence between input coordinate vales (x, y) and output coordinate vales (X, Y) for each of R and B color components is stored may be provided instead of the coordinate transformation operation parts 1441 and 1442 in FIG. 9 and the coordinate values (X, Y) after coordinate transformation corresponding to the coordinate values (x, y) before coordinate transformation may be directly obtained by using the LUT. Similarly, an LUT in which the correspondence between input coordinate values (x, y) and a correction quantity is stored may be provided instead of the coordinate transformation operation parts 1443 and 1447 in FIG. 10 to FIG. 14 and the correction quantity corresponding to the coordinate values (x, y) may be directly obtained by using the LUT. Thereby, it is possible to omit a calculation for coordinate transformation and it is possible to attain a magnification chromatic aberration correction or both a magnification chromatic aberration and a distortion by only a memory chip basically.

Next, FIG. 15 is a diagram illustrating one example of the configuration of a distortion correction part 160. As described above, when a coordinate transformation operation part as illustrated in FIG. 13 or FIG. 14 is used in the magnification chromatic aberration correction part 140, the distortion correction part 160 is not needed. In FIG. 15, there are illustrated an RGB combination part 161 for combining three image data for RGB into a set of data, a coordinate transformation memory for a distortion correction common to the RGB image data 162, an RGB separation part 163 for separating the combined RGB image data into the original color components thereof, a distortion correction-coordinate transformation operation part 164 for calculating a coordinate transformation for a distortion correction with respect to the combined RGB image data in accordance with a predetermined coordinate transformation formula, and a coordinate transformation coefficient table 165 for holding a coefficient (s) used in the coordinate transformation formula.

Because a pixel shift caused by a distortion is large, a buffer memory for storing image data on a screen at most is needed for a distortion correction operation. Meanwhile, the shift is common to all the RGB color components and only one buffer memory with a total bit width of RGB image data is allowed. Herein, the resolution is supposed to VGA (640× 480) and the bit number (color depth) of each of RGB image data is supposed to 8 bits, while the coordinate transformation memory 162 is supposed to be composed of a DRAM in which each of writing and reading 640×480 dots is conducted in a 24-bit unit.

Thus, because a very high capacity is needed for the coordinate transformation memory 162 for distortion correction and it is difficult to include an SRAM in an image processing chip in view of the cost thereof while a 1-port memory is sufficient for RGB, it is desirable to use a DRAM provided outside the image processing chip.

An RGB combining part 161 sequentially receives an input of each of RGB image data (each 8 bits) with a corrected magnification chromatic aberration and combines them into a set of image data (24 bits) for an output. The combined RGB image data are written into the coordinate transformation memory 162 sequentially from the first line in accordance with the coordinate values (x, y).

Meanwhile, the distortion correction-coordinate transformation operation part 164 receives an input of coordinate values (x, y) before coordinate transformation, then calculates a coordinate transformation for distortion correction common to RGB inn accordance with a predetermined coordinate transformation formula such as a polynomial, and outputs coordinate values (X, Y) after coordinate transformation. The coordinate transformation formula may be represented by the same formula (13) as that of a magnification chromatic aberration correction described above. However, the used coordinate transformation coefficients are, of course, different. The coordinate transformation coefficients have already been held in the coordinate transformation coefficient table 165.

As described above, the coordinate transformation formula for distortion correction may be, for example, the same formula (13) as that for a magnification chromatic aberration, and if the calculation results in the magnification chromatic aberration correction (which may be held in a memory or the like) are employed for the terms $X^2$, $y^2$, abs(s), and abs(y) used in the formula (13), it is unnecessary to calculate them newly and it is possible to reduce the circuit scale of the operation party 164.

The coordinate transformation memory 162 sequentially reads out the combined RGB image data based on the coordinate values (X, Y) output from the distortion correction coordinate transformation part 164 in parallel with (accurately, at a predetermined delayed time after) a writing operation of the a combined RGB image data (24 bits) described above. The RGB separation part 163 separates the combined RGB image data (24 bits) read out from the coordinate transformation memory 162 into the original image data of each color component (8 bit).

In the above process, each of RGB image data with corrected magnification chromatic aberration and distortion is output from the RGB separation part 163. That is, each of RGB image data is copied at the original position (x, y).

Additionally, a look-up-table (LUT) in which the correspondence between input coordinate values (x, y) and output coordinate values (X, Y) is stored may also be provided for a distortion correction operation and the coordinate values (X, Y) after coordinate transformation corresponding to the coordinate values (x, y) before coordinate transformation may be directly obtained by using the LUT. Thereby, it is possible to omit a calculation for a coordinate transformation and it may be possible to attain a distortion correction by only a memory chip basically.

Although the illustrative embodiments and specific examples of the present invention have been described above with reference to the accompanying drawings, the present invention is not limited to any of the illustrative embodiments and specific examples and the illustrative embodiments and specific examples may be altered, modified, or combined without departing from the scope of the present invention.

The present application claims the benefit of its priority based on Japanese Patent Application No. 2008-059704 filed on Mar. 10, 2009 in Japan, the entire contents of which are hereby incorporated by reference herein.

What is claimed is:

1. An image processing method configured to process an image captured by using an optical system with a wide view angle and a large magnification chromatic aberration,
    wherein a magnification chromatic aberration correction is conducted by conducting no coordinate transformation for an image of a particular color component while conducting a coordinate transformation for only an image of a color component except the particular color component, and
    wherein a correction quantity is obtained based on a coordinate of the image of a particular color component and the coordinate transformation is conducted by adding the correction quantity to a coordinate value of the image of a color component except the particular color component.

2. The image processing method as claimed in claim 1, wherein the image of a color component except the particular color component is adjusted by further multiplying the coordinate value by a predetermined gain.

3. The image processing method as claimed in claim 1, wherein a distortion correction and the magnification chromatic aberration correction are conducted simultaneously by further obtaining a correction quantity of a distortion commonly for each color component and each adding the correction quantity of the distortion to a coordinate value of an image of each color component.

4. The image processing method as claimed in claim 1, wherein a distortion correction is separately conducted commonly for an image of each color component after the magnification chromatic aberration correction is conducted.

5. The image processing method as claimed in claim 1, wherein the particular color component is green (G) and color components except that are red (R) and blue (B).

6. An image processing device configured to process an image captured by using an optical system with a wide view angle and a magnification chromatic aberration, comprising:
   a magnification chromatic aberration correction device configured to conduct a magnification chromatic aberration correction by conducting no coordinate transformation for an image of a particular color component while conducting a coordinate transformation for only an image of a color component except the particular color component,
   wherein the magnification chromatic aberration correction device obtains a correction quantity based on a coordinate of the image of a particular color component and adds the correction quantity to a coordinate value of the image of a color component except the particular color component to conduct the coordinate transformation.

7. The image processing device as claimed in claim 6, wherein the magnification chromatic aberration correction device adjusts the image of a color component except the particular color component by multiplying the coordinate value by a predetermined gain.

8. The image processing device as claimed in claim 6, wherein the magnification chromatic aberration correction device conducts a distortion correction as well as the magnification chromatic aberration simultaneously by further obtaining a correction quantity of a distortion commonly for each color component and each adding the correction quantity of the distortion to a coordinate value of an image of each color component.

9. The image processing device as claimed in claim 6, further comprising a distortion correction device configured to separately conduct a distortion aberration correction commonly for an image of each color component, behind the magnification chromatic aberration correction device.

10. The image processing device as claimed in claim 6, wherein the particular color component is green (G) and color components except that are red (R) and blue (B).

11. An image capturing device, comprising an optical system with a wide view angle, and at least, a large magnification chromatic aberration, an image capturing element configured to read an image captured via the optical system, and the image processing device as claimed in claim 6.

* * * * *